(12) United States Patent
Shibata et al.

(10) Patent No.: US 7,672,050 B2
(45) Date of Patent: Mar. 2, 2010

(54) REFRACTIVE INDEX CONTROLLED DIFFRACTIVE OPTICAL ELEMENT AND ITS MANUFACTURING METHOD

(75) Inventors: Daisuke Shibata, Akita (JP); Takayuki Nakaya, Tokyo (JP); Hidetoshi Takeda, Saitama (JP); Yoshihito Hatazawa, Akita (JP); Toshiro Kotaki, Tokyo (JP)

(73) Assignee: Namiki Semitsu Houseki Kabushiki Kaisha (JP)

( * ) Notice: Subject to any disclaimer, the term of this patent is extended or adjusted under 35 U.S.C. 154(b) by 536 days.

(21) Appl. No.: 11/486,113

(22) Filed: Jul. 14, 2006

(65) Prior Publication Data

US 2007/0014013 A1    Jan. 18, 2007

(30) Foreign Application Priority Data

Jul. 15, 2005    (JP)    ............... 2005-206265

(51) Int. Cl.
  *G02B 5/18*    (2006.01)
(52) U.S. Cl. ....................... 359/565; 359/569
(58) Field of Classification Search ............... 359/565, 359/569
  See application file for complete search history.

(56) References Cited

U.S. PATENT DOCUMENTS

2003/0190121 A1*  10/2003  Luo et al. ................. 385/37

FOREIGN PATENT DOCUMENTS

| JP | 02000056112 A | * | 2/2000 | ............. 359/569 |
| JP | 2000-249859 |   | 9/2000 |   |
| JP | 2003-035809 |   | 2/2003 |   |

OTHER PUBLICATIONS

Kazuhiro Yamada et al., "Multilevel phase-type diffractive lenses in silica glass induced by filamentation of femtosecond laser pulses", Department of Material and Life Science, 2004 Optical Society of America, Apr. 5, 2004.

* cited by examiner

*Primary Examiner*—Joshua L Pritchett
(74) *Attorney, Agent, or Firm*—Studebaker & Brackett PC; Donald R. Studebaker

(57) ABSTRACT

A refractive index controlled diffractive optical element having a two-dimensional refractive index distribution to be written on a transparent material, wherein a first refractive index region with a refractive index $n_1$ and width $d_1$ is formed in a transparent material, and the ith refractive index region with a refractive index $n_i$ (assuming $n_i \neq n_{i-1}$) and a width $d_i$ is formed adjacent to the (i−1)th refractive index region and opposite to the (i−2)th refractive index region (at an arbitrary side of the (i−1)th refractive index region when i=2) where i is an integer within a range of $2 \leq i \leq x$. Accordingly, a diffractive optical element simultaneously having high diffraction efficiency to a particular order and thinness of the element itself can be obtained.

16 Claims, 4 Drawing Sheets

(a)

(b)

(a)

(b)

(a)

(b)

REFRACTIVE INDEX CONTROLLED DIFFRACTIVE OPTICAL ELEMENT AND ITS MANUFACTURING METHOD

BACKGROUND OF THE INVENTION

This invention relates to a refractive index controlled diffractive optical element formed inside a transparent material and a method for manufacturing that element utilizing a diffraction phenomenon between the regions where refractive indices are changed or between the regions where a refractive index is changed and where a refractive index is not changed.

A refractive index distributed optical elements formed in a transparent material with regions of which the refractive index is different from that of a periphery of substrate is used in a wide range of applications including optical communication and optical devices. Above all, graded index lens (GRIN lens) are used as pickup components etc. for CDs and DVDs because an extremely large number of highly integrated alley bodies, that cannot be manufactured from normal spherical lenses, can easily be obtained.

Among these graded index lenses, binary lenses utilizing the light diffraction phenomenon have an advantage of being capable of reducing the size and weight of an application device because of the small thickness of the lens. In particular, it is preferable from the viewpoint of the robustness of the optical element to form refractive index distributed optical elements by multiphoton absorption of a pulse laser beam because the region having a different refractive index can be created in a transparent material.

A method for forming a binary lens inside a transparent material, such as glass or sapphire, is known as described in Patent Reference 1. This is a binary lens that has a plurality of ring-shaped regions, where a refractive index is concentrically changed with a specified pitch inside glass, and ring-shaped regions formed around the former regions, where a refractive index is invariable, are alternately formed. An example that a pulse laser beam scanned inside of the glass at a constant speed is shown above.

Technology for improving the diffraction efficiency of a binary lens or enabling more complicated optical control, as shown in Non-patent Reference 1 is also known. In this technology, a diffractive lens such as a binary lens is manufactured by creating step-wise regions in a transparent material, such as silica glass, where a refractive index is changed by a specified amount, in the direction of travel of diffracted light, which is limited by simulative blazing a diffractive face.

Patent Reference 1: Patent publication number 2003-35809 (paragraphs 0013 through 0015)

Non-patent Reference 1: Yamada, K. et al. *Optics let*. Vol. 29 No. 16 (2004)

However, in the binary lens shown in the example of Patent Reference 1, a pulse laser beam was scanned inside the glass having a constant laser power at a constant speed, in order to form a binary lens with a region where a refractive index is changed by a certain amount and a region where a refractive index is invariable. Thus, an error in a refractive index distribution is observed in comparison with an ideal curved surface shape as shown in FIG. 1. Therefore, there was a problem that diffraction efficiency of the binary lens as well as performance of the binary lens is limited.

In the technology relating to Non-patent Reference 1, an increase in the number of steps in the region where the refractive index inside a transparent material is changed results in a significant increase in the number of manufacturing processes. Therefore, there was a problem that the time required for manufacturing increases significantly.

In the technology relating to Non-patent Reference 1, when steps in the region where the refractive index is changed are formed inside the transparent material, it was found that the diffractive optical element have different diffraction efficiency for the incidence from the front and reverse sides of the diffractive optical element. Furthermore, there was a special problem that an increase in the number of steps in the region where the refractive index is changed results in a significant shift in the focal length of a binary lens from a theoretical value.

In the technology relating to Non-patent Reference 1, an increase in the number of steps in the region where the refractive index inside the transparent material is changed results in a proportional increase in the thickness of the region where the refractive index is changed, leading to an increase in the thickness of a binary lens itself. Thus, there was a problem that an effect of reducing the thickness, which was the greatest advantage of a binary lens, is diminished.

This problem is present not only in binary lenses but also in entire diffractive optical elements. An attempt to increase the number of steps in the region where the refractive index inside a transparent material is changed to raise the level of blazing in order to improve the diffraction efficiency to a particular order results in an increase in the number of scans by the pulse laser in proportion to the number of the steps. Thus, there was a problem that complicated manufacturing processes significantly increase manufacturing time, leading to an increase in the thickness of formed diffractive optical elements.

SUMMARY OF THE INVENTION

An object of this invention provided to solve the above problems is to obtain a diffractive optical element having both high diffraction efficiency to a particular order and reduced thickness of the diffractive optical element itself.

The inventors made this invention by finding that it is important to form a region having various refractive indices inside a transparent material using pulse laser beams of various laser powers, various laser scanning speeds, or various laser scanning intervals in order to maintain the thinness of the diffractive optical element and to form the diffractive optical element having high efficiency.

That is to say, the invention provides a refractive index controlled diffractive optical element with (having?) a two-dimensional refractive index distribution to be written in a transparent material, wherein a first refractive index region with a refractive index $n_1$ and width $d_1$ is formed in the transparent material, and the ith refractive index region with a refractive index $n_i$ (assuming $n_i \neq n_{i-1}$) and a width $d_i$ is formed adjacent to the (i−1)th refractive index region and opposite to the (i−2)th refractive index region (at an arbitrary side of the (i−1)th refractive index region when i=2), where i is an integer within the range of $2 \leq i \leq x$.

In case that, for example, a two-dimensional refractive index distribution is concentrically formed, the diffractive optical element according to this invention is configured so that the ith refractive index region is formed in the condition of being adjacent to the inside (or outside) of the (i−1)th refractive index region, when a second refractive index region is adjacent to the inside (or outside) of the first refractive index region.

It is preferable to configure a part of the first through xth refractive index regions with regions where the refractive index is invariable because it is possible to omit a forming process relating to a portion corresponding to the above-mentioned invariable region. In addition, it is possible to apply integers of 2 or more (however, 3 or more when using a region where a refractive index is not changed by a pulse laser as a refractive index region) to the value x of the number of the above refractive index regions.

The invention also provides a refractive index controlled diffractive optical element having the configuration according to Claim 1, wherein the first through xth refractive index regions are formed inside a transparent material.

The invention also provides a refractive index controlled diffractive optical element having the configuration according to Claim 1, wherein the transparent material is silica glass or a single crystal sapphire.

The invention also provides a refractive index controlled diffractive optical element, wherein the transparent material is silica glass or a single crystal sapphire.

The invention also provides a refractive index controlled diffractive optical element, wherein the first refractive index region is located adjacent to the xth region and opposite the (x−1)th region, and the first through xth refractive index regions incrementally increase or decrease in refractive index by a constant value in the range from $n_1$ to $n_x$.

The invention also provides a refractive index controlled diffractive optical element, wherein the first refractive index region is located adjacent to the xth region and opposite the (x−1)th region, and the first through xth refractive index regions incrementally increase or decrease in refractive index by a constant value in the range from $n_1$ to $n_x$.

The invention also provides a refractive index controlled diffractive optical element, wherein the first refractive index region is located adjacent to the xth region and opposite the (x−1)th region, and the first through xth refractive index regions incrementally increase or decrease in refractive index by a constant value in the range from $n_1$ to $n_x$.

When applying a processing condition that the refractive index is changed to be larger than the original, it is preferable to take the first or xth refractive index region as an invariable refractive index region to configure the element so that the refractive index in each refractive index region incrementally increases up to the xth or first refractive index region. On the other hand, when applying a processing condition that the refractive index is changed to be smaller than the original, it is preferable to take the first or xth refractive index region as an invariable refractive index region to configure the element so that the refractive index in each refractive index region incrementally decreases up to the xth or first refractive index region.

The invention also provides a refractive index controlled diffractive optical element, wherein the diffractive optical element is used as a grating, the first through xth refractive index regions are formed in parallel with each other, and widths $d_1$ to $d_x$ of the first through xth refractive index regions have the same value.

The invention also provides a refractive index controlled diffractive optical element, wherein the diffractive optical element is used as a grating, the first through xth refractive index regions are formed in parallel with each other, and widths $d_1$ to $d_x$ of the first through xth refractive index regions have the same value.

The invention also provides a refractive index controlled diffractive optical element, wherein the diffractive optical element is used as a grating, the first through xth refractive index regions are formed in parallel with each other, and widths $d_1$ to $d_x$ of the first through xth refractive index regions have the same value.

Each refractive index region is formed so that it has an interval D expressed as $$D=(x-1)d \qquad \text{[Equation 1]}$$

where x is the number of refractive index regions.

The invention also provides a refractive index controlled diffractive optical element, wherein the diffractive optical element is used as a binary lens, the two-dimensional refractive index distribution has a repetitive pattern that the first through xth refractive index regions are concentrically arranged in increasing or decreasing order of refractive index, jth ($1 \leq j \leq x$) refractive index region is circularly formed at the center of the concentric circles (1) in case of $1 \leq i \leq x-1$, (i+1)th refractive index region is formed adjacent to an outer periphery of ith concentric circle in a ring shape, (2) in case of i=x, first refractive index region is formed adjacent to an outer periphery of ith concentric circle in a ring shape, and widths $d_1$ to $d_x$ of the first through xth refractive index regions are the differences of radii between the inner and outer peripheries of the circles.

The invention also provides a refractive index controlled diffractive optical element, wherein the diffractive optical element is used as a binary lens, the two-dimensional refractive index distribution has a repetitive pattern that the first through xth refractive index regions are concentrically arranged in increasing or decreasing order of refractive index, jth ($1 \leq j \leq x$) refractive index region is circularly formed at the center of the concentric circles (1) in case of $1 \leq i \leq x-1$, (i+1)th refractive index region is formed adjacent to an outer periphery of ith concentric circle in a ring shape, (2) in case of i=x, first refractive index region is formed adjacent to an outer periphery of ith concentric circle in a ring shape, and widths $d_1$ to $d_x$ of the first through xth refractive index regions are the differences of radii between the inner and outer peripheries of the circles.

The invention also provides a refractive index controlled diffractive optical element, wherein the diffractive optical element is used as a binary lens, the two-dimensional refractive index distribution has a repetitive pattern that the first through xth refractive index regions are concentrically arranged in increasing or decreasing order of refractive index, jth ($1 \leq j \leq x$) refractive index region is circularly formed at the center of the concentric circles (1) in case of $1 \leq i \leq x-1$, (i+1)th refractive index region is formed adjacent to an outer periphery of ith concentric circle in a ring shape, (2) in case of i=x, first refractive index region is formed adjacent to an outer periphery of ith concentric circle in a ring shape, and widths $d_1$ to $d_x$ of the first through xth refractive index regions are the differences of radii between the inner and outer peripheries of the circles.

In this case, when the above binary lens is configured so that it repeats a pattern where a refractive index of each refractive index region incrementally increases toward the outside from the first refractive index region up to the xth refractive index region, the binary lens is provided with a function similar to that of a concave lens.

In this case, when the above binary lens is configured so that it repeats a pattern where a refractive index of each refractive index region incrementally decreases toward the outside from the first refractive index region up to the xth refractive index region, the binary lens is provided with a function similar to that of a convex lens.

The invention also provides a refractive index controlled diffractive optical element, wherein a radius r representing a radius of an inner periphery of mth ring and a radius of an outer periphery of the (m−1)th ring starting from the center of a concentric circle is expressed as $$r = \sqrt{\frac{2fm\lambda}{L} - \left(\frac{m\lambda}{L}\right)^2}, \qquad \text{[Equation 2]}$$

where f is a focal length of a lens and λ is a wavelength of light to be diffracted.

The invention also provides a refractive index controlled diffractive optical element, wherein a radius r representing a radius of an inner periphery of mth ring and a radius of an outer periphery of the (m−1)th ring starting from the center of a concentric circle is expressed as $$r = \sqrt{\frac{2fm\lambda}{L} - \left(\frac{m\lambda}{L}\right)^2},$$ [Equation 2]

where f is a focal length of a lens and λ is a wavelength of light to be diffracted.

The invention also provides a refractive index controlled diffractive optical element, wherein a radius r representing a radius of an inner periphery of mth ring and a radius of an outer periphery of the (m−1)th ring starting from the center of a concentric circle is expressed as $$r = \sqrt{\frac{2fm\lambda}{L} - \left(\frac{m\lambda}{L}\right)^2},$$ [Equation 2]

where f is a focal length of a lens and λ is a wavelength of light to be diffracted.

The invention also provides a method for manufacturing a refractive index controlled diffractive optical element having two-dimensional refractive index distribution to be written in a transparent material using a pulse laser comprising a process (1) where a focal point of the pulse laser is scanned inside the transparent material by moving the transparent material relative to the pulse laser at a specified speed in order to form a first refractive index region with a width $d_1$ by changing the refractive index to $n_1$ around a section where the focal point is scanned, and a process (2) where the ith refractive index region with a refractive index $n_1$ (assuming $n_i \neq n_{i-1}$) and a width $d_i$ at a location adjacent to a section where the focal point is scanned in a similar manner is formed adjacent to the (i−1)th refractive index region and opposite to the (i−2)th refractive index region (at an arbitrary side of the (i−1)th refractive index region when i=2) where i is an integer within the range of 2≦i≦x.

The invention also provides a method for manufacturing a refractive index controlled diffractive optical element, wherein the transparent material is irradiated by focused pulse laser having a property of causing multiphoton absorption.

The invention also provides a method for manufacturing a refractive index controlled diffractive optical element, wherein the transparent material is silica glass or single crystal sapphire.

The invention also provides a method for manufacturing a refractive index controlled diffractive optical element, wherein the transparent material is silica glass or single crystal sapphire.

The invention also provides a method for manufacturing a refractive index controlled diffractive optical element, wherein the transparent material is irradiated by the focused pulse laser while changing the relative scanning speed between the transparent material and the pulse laser.

The invention also provides a method for manufacturing a refractive index controlled diffractive optical element, wherein the transparent material is irradiated by the focused pulse laser while changing the relative scanning speed between the transparent material and the pulse laser.

The invention also provides a method for manufacturing a refractive index controlled diffractive optical element, wherein the transparent material is irradiated by the focused pulse laser while changing the relative scanning speed between the transparent material and the pulse laser.

In this case, when the first through xth refractive index regions are formed by properly changing a relative speed of a pulse laser for scanning the transparent material to adjust the change of the refractive index of each refractive index region, the scanning speed is increased and decreased in the places where the change of the refractive index is small and large, respectively. At this time, since it is not necessary to change a laser power, more stable laser power is obtained, enabling the diffractive optical element to generate a more accurate refractive index change.

The invention also provides a method for manufacturing a refractive index controlled diffractive optical element, wherein the transparent material is irradiated by the focused pulse laser while changing the laser intensity of the pulse laser.

The invention also provides a method for manufacturing a refractive index controlled diffractive optical element, wherein the transparent material is irradiated by the focused pulse laser while changing the laser intensity of the pulse laser.

The invention also provides a method for manufacturing a refractive index controlled diffractive optical element, wherein the transparent material is irradiated by the focused pulse laser while changing the laser intensity of the pulse laser.

In this case, when the first through xth refractive index regions are formed by properly changing the laser intensity of a pulse laser to adjust the change of the refractive index of each refractive index region, the laser intensity is decreased and increased in places where the change of the refractive index is small and large, respectively. At this time, the variation of the refractive index of each refractive index region is eliminated to improve the accuracy of the diffractive optical element. Further, since it is not necessary to reduce a laser processing speed, loss of processing efficiency can be avoided.

The invention also provides a method for manufacturing a refractive index controlled diffractive optical element, wherein the transparent material is irradiated by the focused pulse laser while changing the scanning intervals of the pulse laser during scanning of the transparent material.

The invention also provides a method for manufacturing a refractive index controlled diffractive optical element, wherein the transparent material is irradiated by the focused pulse laser while changing the scanning intervals of the pulse laser during scanning of the transparent material.

The invention also provides a method for manufacturing a refractive index controlled diffractive optical element, wherein the transparent material is irradiated by the focused pulse laser while changing the scanning intervals of the pulse laser during scanning of the transparent material.

In this case, when the first through xth refractive index regions are formed by properly changing the intervals of the pulse laser for scanning the transparent material to adjust the change of the refractive index of each refractive index region, it is possible to reduce a scanning amount of the pulse laser required for manufacturing diffractive optical elements by, for example, setting a pulse laser at a laser power that increases the change of the refractive index to decrease the scanning intervals in the place where the change of the refractive index is large and to increase the scanning intervals in the place where the change of the refractive index is small. Thus, the processing efficiency of the diffractive optical element can be improved.

The refractive index controlled diffractive optical element according to this invention enables an increase in the number of refractive indices to be formed inside a transparent material and raise the level of blazing of the diffractive optical element by applying a configuration for forming a two-dimensional refractive index distribution using refractive index regions with a plurality of refractive indices. Therefore, both effects that enable an improvement in the diffraction efficiency of the diffractive optical element to a particular order and that enable a reduction in thickness of the diffractive optical element can be obtained.

The refractive index controlled diffractive optical element of this invention produces an effect that prevents degradation of the refractive index region by forming the first through xth refractive index regions inside the transparent material because it is possible to realize a reduction in thickness of a diffractive optical element and to protect the diffractive optical element with the surface of the transparent material without allowing each refractive index region to be exposed.

The refractive index controlled diffractive optical element of this invention produces an effect that sufficient mechanical strength can be maintained even if the thickness of the diffractive optical element is reduced by using silica glass or a single crystal sapphire as a transparent material.

The refractive index controlled diffractive optical element of this invention produces an effect that a refractive index of each refractive index region can be easily controlled by locating the first refractive index region adjacent to the xth refractive index region and opposite to the (x−1)th refractive index region to obtain a repetitive pattern in the first through xth refractive index regions and using a plurality of regions having the same refractive index within the same diffractive optical element.

The refractive index controlled diffractive optical element of this invention produces an effect that a grating with a significantly excellent diffraction efficiency to a particular order can be obtained by forming the first through xth refractive index region in parallel with each other and equalizing the widths of the regions, regardless of whether an incident light comes from the front side or backside.

The refractive index controlled diffractive optical element according to of this invention produces an effect that a binary lens having (1) high diffraction efficiency by concentrically forming a particular refractive index region at the center of the concentric circle, forming ring shaped refractive index regions around that refractive index region, and making these refractive index regions having a size obtained by the specified equation regardless of whether the incident light comes from the front side or backside, and (2) highly accurate focal length by reducing the thickness in the optical axis direction can be obtained.

On the other hand, the method for manufacturing a refractive index controlled diffractive optical element enables the forming of refractive index regions with an arbitrary refractive index by irradiating the focused pulse laser. In particular, even when changing the refractive index in each refractive index region formed inside a transparent material to raise the level of blazing of the diffractive optical element, the number of scans by a pulse laser hardly increases. Therefore, an effect that laser processing time is significantly reduced when forming a diffractive optical element having a high blazing level and high diffraction efficiency can be obtained.

The method for manufacturing a refractive index controlled diffractive optical element produces an effect that the refractive index region can be easily created inside the transparent material by irradiating the transparent material by the focused pulse laser having a property of causing multiphoton absorption.

The method for manufacturing a refractive index controlled diffractive optical element produces an effect that the refractive index of each refractive index region can be adjusted to an arbitrary value by using a continuous factor such as scanning speed, laser intensity, or a scanning interval of the pulse laser to irradiate the transparent material by the focused pulse laser, thus leading to easier creation of a lens having an optimized refractive index distribution.

DESCRIPTION OF THE PREFERRED EMBODIMENTS

Figure 1:
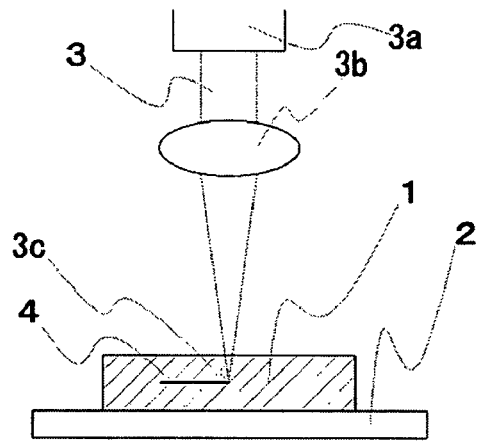
FIG. 1 is a diagram for explaining a method for processing a transparent material using a pulse laser relating to the embodiment.

Now preferred embodiments for implementing this invention are described. This is an embodiment for a method of manufacturing a refractive index controlled diffractive optical element, wherein a two-dimensional refractive index pattern 4 is formed inside a transparent material 1 by irradiating the transparent material 1 using focused pulse laser 3 to cause multiphoton absorption.

A material of which the refractive index changes by the irradiation of the focused pulse laser 3 is used as the transparent material 1 applying to this embodiment. Especially when forming the refractive index pattern 4 inside the transparent material 1, it is necessary to irradiate the transparent material 1 using the focused pulse laser 3 to cause multiphoton absorption. Therefore, it is necessary to use a material of which absorption in the wavelength range of the pulse laser 3 for focusing is small and in which a refractive index is changed by the multiphoton absorption. Specifically, glass, such as silica or borosilicate glass, and crystal of oxide, such as quartz or a single crystal of sapphire, can be used.

When a titanium-sapphire laser with a wavelength of 800 nm is used as the pulse laser 3, it is preferable to use silica glass or a single crystal sapphire as the transparent material 1, because the mechanical strength of the diffractive optical element increases and sufficient mechanical strength can be maintained even if the thickness of the diffractive optical element is reduced. On the other hand, it is also preferable to use the above materials to form a diffractive optical element applicable to light having a larger wavelength, because the change of the refractive index can be increased by the irradiation of the focused pulse laser 3.

When the change of the refractive index cannot sufficiently be obtained by the irradiation of the focused pulse laser 3 as in the case of a large wavelength of light to be diffracted, it is possible to solve the problem by arranging the refractive index pattern 4 in double rows in the thickness direction. In this case, it is preferable to perform processing in order from the far side of a laser emission source 3a to prevent the adverse effect of the refractive index region already formed.

The surface of the transparent material 1 should be made flat by polishing etc. prior to the irradiation of the focused pulse laser 3. This is because flattening the surface of the transparent material 1 stabilizes the position of a focal point 3c when the pulse laser 3 is focused to form a diffractive optical element more accurately. As a specific method for polishing etc., a means using stationary or fluidized abrasive grains or other prior art can be applied.

The transparent material 1 with its surface flattened is placed on a table 2 of a pulse laser irradiation system. The pulse laser 3 generated by a laser emission source 3a is focused by a condenser lens 3b and irradiated to the transparent material 1.

It is preferable to use a pulse laser 3 having a property of causing multiphoton absorption when the transparent material 1 is irradiated by the focused pulse laser 3. More specifically, it is preferable to use a pulse laser with pulse width from 100 fs (1 fs=$10^{-15}$ s) to 1 ps. The laser with this pulse width has laser intensity of 10 TW/cm$^2$ or more. The transparent material 1 can be modified by multiphoton absorption around a focal point 3c of the pulse laser 3 having laser intensity like this.

When modifying the transparent material 1 by such multiphoton absorption, thermal diffusion is hardly generated around the multiphoton absorption section and only the portion around the focal point 3c of the pulse laser 3 can be modified. Thus, this method is very preferable for forming a fine and small refractive index pattern 4. A titanium-sapphire laser is preferable as the pulse laser 3 satisfying these conditions.

It is preferable to change a repetition rate of the pulse laser 3 in response to a scanning speed so as to optimize overlaps between regions to be processed by each pulse of the pulse laser 3. However, the repetition rate of 1 kHz or less is not preferable because of the extremely low processing speed of the pulse laser 3.

It is preferable that the pulse laser 3 is focused and irradiated with the focal point 3c positioned inside the transparent material 1. It is possible to form a diffractive optical element inside the transparent material 1 of the refractive index pattern 4 by irradiating the inside of the transparent material 1 by the focused pulse laser 3. Thus, an element portion can be protected by the surface of the transparent material 1 while realizing a reduction in thickness of the diffractive optical element and avoiding exposure of the refractive index pattern 4.

The refractive index pattern 4 is formed as follows. The transparent material 1 is irradiated by the focused pulse laser 3 and, at the same time, the transparent material 1 is moved relative to the pulse laser 3 at a specified speed using a means such as an XYZ stage installed to the table 2. The focal point 3c of the pulse laser 3 is scanned inside the transparent material 1 by the table 2, and the refractive index of the transparent material 1 is changed around the portion where the focal point 3c is scanned to form the refractive index pattern 4.

Figure 2:
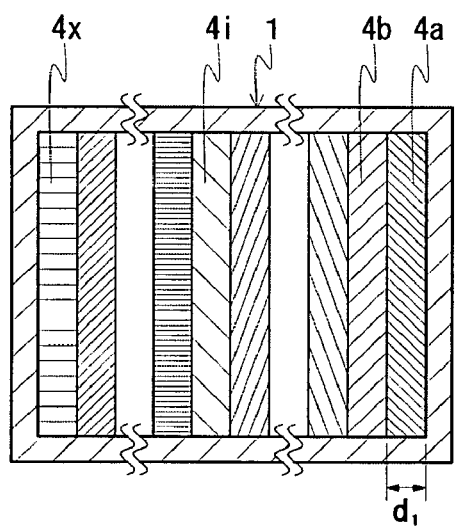
FIG. 2 is a schematic view showing an example of a diffractive optical element relating to the embodiment.

At this time, the refractive index pattern 4 is arranged so as to have a plurality of different two-dimensional refractive indices, for example, as shown in FIG. 2. More specifically, the refractive index pattern 4 is arranged so as to have the first refractive index region 4a with a width $d_1$ and ith refractive index region 4i adjacent to the (i−1)th refractive index region and opposite to the (i−2)th refractive index region (at an arbitrary side of the (i−1)th refractive index region when i=2) where i is an integer within a range of 2≦i≦x. In this case, refractive indices in the first through xth refractive index regions 4a through 4x, respectively, are made different from the refractive index of an adjacent refractive index region.

The first refractive index region 4a is formed adjacent to the xth refractive index region 4x and opposite to the (x−1)th refractive index region. Thus, a refractive index of each refractive index region is incrementally increased or decreased from a refractive index $n_1$ of the first refractive index region up to a refractive index $n_x$ of the xth refractive index region within the first through xth refractive index regions 4a through 4x to make a repetitive pattern having step-wise distribution of refractive indices themselves. This configuration is preferable because of convenient refractive index control.

When forming each refractive index region, it is preferable to apply regions where refractive indices are invariable in one or more regions of the first through xth refractive index regions because the forming process relating to the invariable region can be omitted.

It is preferable to use the following first through third methods for providing a single transparent material 1 with a plurality of different refractive indices in order to form the abovementioned first through xth refractive index regions 4a through 4x, respectively, by the irradiation of the focused pulse laser 3.

The first method is to form the first through xth refractive index regions 4a through 4x, respectively, by changing a scanning speed of the pulse laser 3 relative to the transparent material 1 to irradiate the transparent material 1 by the focused pulse laser 3.

In this case, when adjusting the change of the refractive index by changing the scanning speed of the pulse laser 3 relative to the transparent material 1, the scanning speed is increased and decreased at portions where the change of the refractive index are small and large, respectively. In addition, the scanning speed is determined based on the relation between the scanning speed and the refractive index change in the transparent material 1 used for the diffractive optical element prior to forming each refractive index region.

The scanning speed of the pulse laser 3 in this method is about 0.01 to 1 mm/s when, for example, silica glass is used as the transparent material 1. Since it is not necessary to change a laser power in this method, more stable laser power is obtained, and the diffractive optical element can be provided with a more accurate refractive index change.

The second method is to form the first through xth refractive index regions 4a through 4x, respectively, by properly changing the laser intensity of the pulse laser 3 and irradiating the transparent material 1 by the focused pulse laser 3.

In this method, when adjusting the change of the refractive index by changing the laser intensity of the pulse laser 3, the laser intensity is decreased and increased at the portions where the change of the refractive index are small and large, respectively. The laser intensity is determined based on the relation between the laser intensity and the refractive index change that was investigated as for the transparent material 1 used for the diffractive optical element prior to forming each refractive index region.

It is preferable that the laser intensity of the pulse laser 3 in this method is in the range between about 100 and 1000 mW when, for example, silica glass is used for the transparent material 1. It is not preferable to raise the laser intensity over 1000 mW because cracks are easily generated in the transparent material 1. It is not necessary to reduce a laser processing speed in this method in which the laser intensity is incrementally changed.

The third method is to form the first through xth refractive index regions 4a through 4x by irradiating the transparent material 1 by the focused pulse laser 3 while properly changing intervals at which the pulse laser 3 scans the transparent material 1.

In this method, when adjusting the change of the refractive index by changing the scanning intervals of the pulse laser 3 in the transparent material 1, the pulse laser 3 is set at a laser power that, for example, increases the change of the refractive index, and the interval is increased and decreased in the portion where the change of the refractive index is small and large, respectively. It is not necessary to change the condition of the pulse laser 3 required for manufacturing of diffractive optical elements in this method.

When forming, for example, the diffractive optical elements as a grating to form each refractive index region by applying a means such as the above first through third methods, the refractive index regions are formed so as to be parallel with each other. On the other hand, when forming the diffractive optical element as a binary lens, an arbitrary refractive index region is circularly formed to concentrically form each ring-shaped refractive index region around the former refractive index region.

Figure 3:
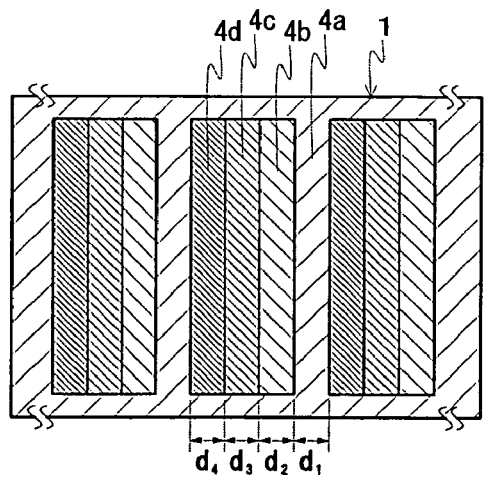
FIG. 3 is a schematic front view showing a mode of so-called 4-level grating according to the embodiment.

In this case, when forming the diffractive optical elements as a grating, the configuration at x=4 is formed so as to equalizing widths $d_1$ through $d_x$ of the first through xth refractive index regions 4a through 4x (equal to d) as shown in FIG. 3. Therefore, an interval D between two regions having the same refractive index is formed at a value expressed as $$D=(x-1)d \qquad \text{[Equation 3]}$$

where x is the number of refractive index regions.

On the other hand, when forming the diffractive optical elements as a binary lens, it is preferable to configure the two-dimensional refractive index distribution as a repetitive pattern where the first through xth refractive index regions are concentrically arranged in order of decreasing or increasing refractive index, to circularly form the jth ($1 \leq j \leq x$) refractive index region, and to take the following configuration:

(1) In the case of $1 \leq i \leq (x-1)$, (i+1)th refractive index region is formed in a ring shape adjacent to the outer periphery of ith refractive index region.

(2) In the case of i=x, the first refractive index region is formed in a ring shape adjacent to the outer periphery of the ith refractive index region.

In this case, when the binary lens is configured as a concave lens, each refractive index region in the binary lens is arranged so as to provide a repetitive pattern where the refractive index in each refractive index region is incrementally increased toward the outside from the first refractive index region up to xth refractive index region in addition to the above configuration. On the other hand, when the binary lens is configured as a convex lens, each refractive index region in the binary lens is arranged so as to provide a repetitive pattern where the refractive index in each refractive index region is incrementally decreased toward the outside.

Figure 4:
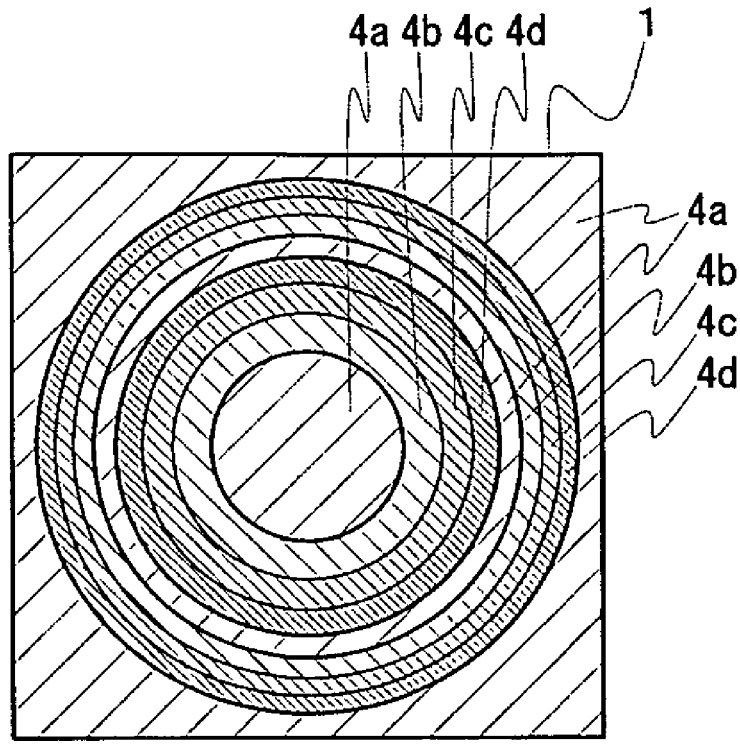
FIG. 4 is a schematic front view showing a mode of so-called 4-level binary lens according to the embodiment.

The binary lens is configured so that widths $d_1$ through $d_x$ of the first through xth refractive index regions 4a through 4x are incrementally decreased toward the outside of the binary lens as shown in FIG. 4 in case of, for example, x=4. Specifically a radius r showing the radius of an inner periphery of mth ring from the center of a concentric circle and the radius of an outer periphery of (m−1)th ring is expressed as $$r = \sqrt{\frac{2fm\lambda}{L} - \left(\frac{m\lambda}{L}\right)^2}, \qquad \text{[Equation 4]}$$

where f is a focal length of the binary lens, λ is a wavelength of light to be diffracted and L is a value called the level number of a diffractive optical element. In this case, the widths of the refractive index regions $d_1$ through $d_x$ are the radius difference between the outer and inner peripheries of each refractive index region, and larger m results in a smaller width. When the binary lens is configured so that the refractive index in each refractive index region is incrementally increased or decreased by a constant value from refractive index $n_1$ in the first refractive index region to refractive index $n_x$ in the xth refractive index region between the first through xth refractive index regions 4a through 4x, L is equal to the value of x, which is the number of refractive index regions. An integer 2 or more (3 or more when the refractive index region includes a region where a refractive index is invariable) can be applied to this value of L. The larger value of L is preferable because the larger value results in higher diffraction efficiency, and, for example, the 8-level or more results in the diffraction efficiency of 95% or more.

In this case, although it is possible to configure circular refractive index regions to be formed at the central section of the concave or convex lens using an arbitrary refractive index region among the first through xth refractive index regions 4a through 4x, the central section has the largest area. Therefore, it is preferable to apply the regions where the refractive index is invariable to this region because the time required by processes for forming the concave or convex lens can be reduced.

Thus, the transparent material 1 where refractive index regions are formed can industrially be used as a grating, a binary lens, or a diffractive optical element.

EMBODIMENTS

Figure 6:
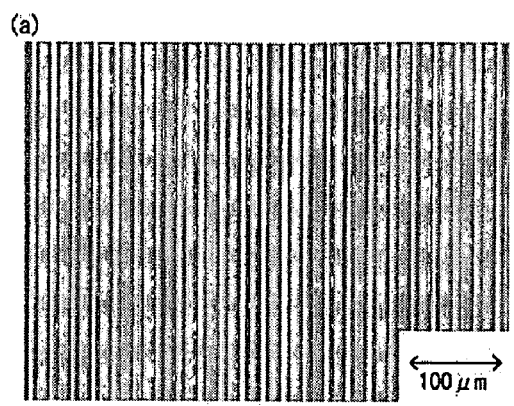
FIG. 6 is optical microscopic images of front and cross-sectional views of the grating relating to Embodiment 1.
Figure 6:
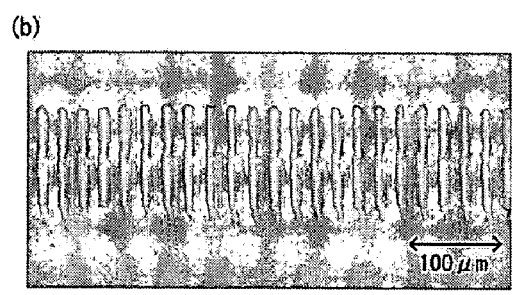
Figure 8:
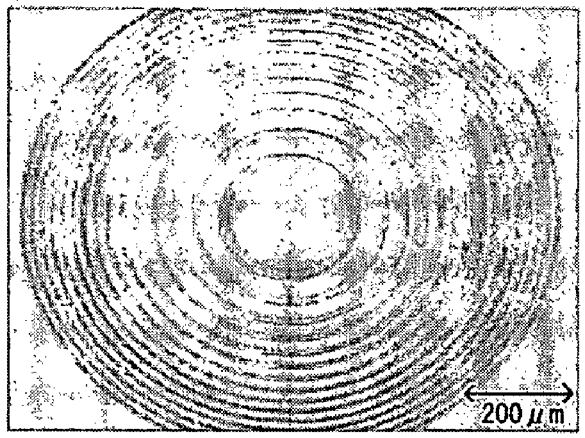
FIG. 8 is optical microscopic images of front and cross-sectional views of the binary lens relating to Embodiment 2.
Figure 8:

The invention is explained in detail using the following embodiments and FIGS. 6 and 8.

Embodiment 1

This embodiment provides a so-called 4-level grating using synthetic silica glass as a transparent material 1 in which the first through 4th refractive index regions 4a through 4d having four types of phase change as shown in FIG. 6.

This embodiment uses a flat plate with 4 mm thick made of synthetic silica glass, both surfaces of which were polished in advance to obtain flat surfaces. The synthetic silica glass plate was placed on the table 2. The pulse laser 3 with a pulse width of 150 fs, a repetition rate of 200 kHz and a laser power of 550 mW was generated from the laser emission source 3a. The pulse laser 3 was focused to form the focal point 3c at the middle section of thickness of the synthetic silica glass using the condenser lens 3b. The focal point 3c was scanned and each two dimensional refractive index region was formed inside the plate.

In this case, the first refractive index region 4a was specified as the region where a refractive index is invariable. The second refractive index region 4b was formed at scanning intervals of 2.50 μm and at a scanning speed of 400 μm/s for the pulse laser 3. The third refractive index region 4c was formed at scanning intervals of 0.63 μm and at a scanning speed of 400 μm/s for the pulse laser 3. Further, the fourth refractive index region 4d was formed at scanning intervals of 0.63 μm and at a scanning speed of 100 μm/s for the pulse laser 3. Thus, all of the refractive index regions were formed so as to give the same width. Then the refractive index pattern 4 was obtained by forming a repetitive pattern in order of the first refractive index region 4a, the second refractive index region 4b, the third refractive index region 4c, and the fourth refractive index region 4d as shown in FIG. 5(a). The widths of the first through fourth refractive index regions 4a through 4d were provided with the same value of 6.25 μm, and these refractive index regions are formed so as to be in parallel with each other.

As a result, the front face of the formed grating presented a fringe pattern as shown in the picture of FIG. 6 (a). On the other hand, the cross-section of the grating presented the pattern as shown in the picture of FIG. 6 (b) with processed region 130 μm thick. The diffraction efficiency of the primary diffracted light was 45% in both cases of incidence from the front and reverse sides of the grating. That is to say, a grating having the same diffraction efficiency in cases of incidence from the front and reverse sides was formed.

Comparison Example 1

As a comparison example, the flat plate of synthetic silica glass was prepared in the above procedures. And the pulse laser 3 was scanned inside the flat plate to form the refractive index pattern 4 step-wise in the direction of travel of diffracted light in the same condition as used for the embodiment as shown in FIG. 7.

Figure 5:
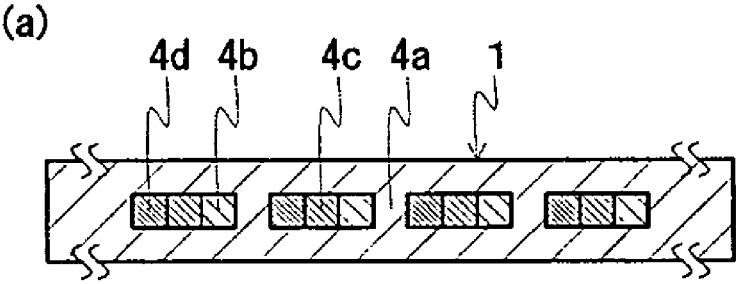
FIG. 5 is cross-sectional views showing an arrangement of each refractive index region formed by the pulse laser in the direction of element thickness in the diffractive optical element relating to each embodiment and comparison example.
Figure 5:
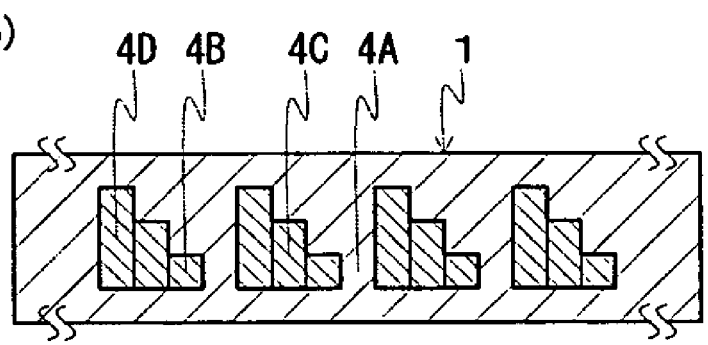

In this case, the pulse laser 3 was scanned inside the flat plate to form refractive index pattern 4 in the same condition as that of the second refractive index region relating to above Embodiment 1, namely at scanning intervals of 2.50 μm and a scanning speed of 400 μm/s. The portions corresponding to the third and fourth refractive index regions were formed by stacking processing regions in two or three layers so as to make the thickness of the refractive index pattern 4 two to three times. The regions having zero (region where refractive index is invariable), one, two, and three layers of the processed region were provided with the same thickness. A repetitive pattern was formed in order of region 4A where the refractive index is invariable, region 4B having one layer of processed region, region 4C having two layers of processed region, and region 4D having three layers of processed region as shown in FIG. 5 (b). The regions 4A through 4D were provided with the same width of 6.25 μm and formed to be in parallel with each other.

Figure 7:
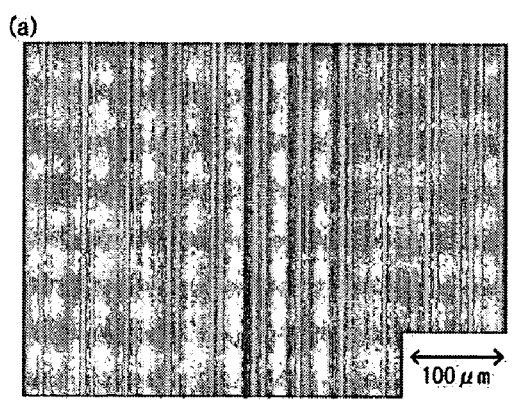
FIG. 7 is optical microscopic images of front and cross-sectional views of the grating relating to Comparison example 1.
Figure 7:
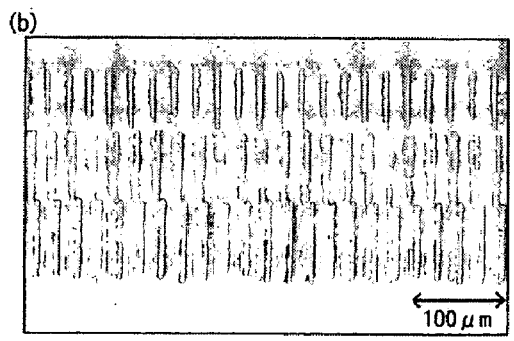

As a result, the front face of the formed grating presented a fringe pattern similar to that of the above Embodiment 1 as shown in the picture of FIG. 7 (a). On the other hand, the cross-section of the grating presented the pattern as shown in the picture of FIG. 7 (b) with a processed region 250 μm thick, namely two times that of the above Embodiment 1. The diffraction efficiency of the primary diffracted light for incidence from the front side of the grating was 46%. On the other hand, the diffraction efficiency of the primary diffracted light for incidence from the reverse side of the grating was 37%. That is to say, the formed grating was found to have different diffraction efficiency for incidence from the front and reverse sides.

Embodiment 2

This embodiment provides a so-called 4-level binary lens using synthetic silica glass as a transparent material 1 in which the first through 4β refractive index regions 4a through 4d having four types of phase change as shown in FIG. 8.

This embodiment uses a flat plate with 4 mm thick made of synthetic silica glass, both surfaces of which were polished in advance to obtain flat surfaces. The synthetic silica glass plate was placed on the table 2. The pulse laser 3 with a pulse width of 150 fs and a repetition rate of 200 kHz was generated from the laser emission source 3a. The pulse laser 3 was focused to form the focal point 3c at the middle section of thickness of the synthetic silica glass using the condenser lens 3b. The focal point 3c of the pulse laser 3 was scanned inside the plate at a scanning speed of 25 μm/s and at a scanning interval of 2.50 μm to form each refractive index region two dimensionally.

In this case, the first refractive index region 4a was specified as the region where the refractive index is invariable. The pulse laser 3 was scanned inside the plate to form the second refractive index region 4b at a laser power of 346 mW. The third and fourth refractive index regions 4c and 4d were formed at laser powers of 474 mW and 800 mW, respectively. Then the refractive index pattern 4 was obtained by forming a repetitive pattern in order of the first refractive index region 4a, the second refractive index region 4b, the third refractive index region 4c, and the fourth refractive index region 4d from the inside at a designed focal length of 15 mm according to the above [Equation 2].

As a result, the front face of the formed binary lens presented a concentric pattern as shown in the picture of FIG. 8 (a). The binary lens has a diameter of 1.06 mm. On the other hand, the cross-section of the binary lens presented the pattern as shown in the picture of FIG. 8 (b) with a processed region 110 μm thick. Thus, the binary lens having a diameter of 1.06 mm and a focal length of 15 mm with a spot diameter of 19 μm at the focal point of the binary lens was formed. By the way, the processing time of the binary lens in this embodiment was about 3 hours and 30 minutes.

Comparison Example 2

On the other hand, as a comparison example for Embodiment 2, the flat plate 4 mm thick of synthetic silica glass was prepared in the above procedures. And the pulse laser 3 was scanned inside the flat plate to form the refractive index pattern 4 step-wise in the direction of travel of diffracted light in the same condition as used for the embodiment as shown in FIG. 9.

In this case, the pulse laser 3 was scanned inside the flat plate to form the modified refractive index layer in the same condition as that of the second refractive index region relating to above Embodiment 2, namely at a laser power of 346 mW. The portions corresponding to the above third and fourth refractive index regions were formed by stacking modified refractive index layers to provide two or three layers so as to make the thickness of the refractive index region 4 two to three times. A repetitive pattern was formed according to Equation 2 in order of the innermost region 4A (invariable refractive index region) where no modified refractive index layer is stacked to provide no layer, region 4B where a modified refractive index layer is used to provide one layer, region 4C where modified refractive index layers are stacked to provide two layers and region 4D where modified refractive index layers are stacked to provide three layers with a designed focal length of 15 mm to obtain the refractive index pattern 4 as shown in FIG. 5 (*b*).

Figure 9:
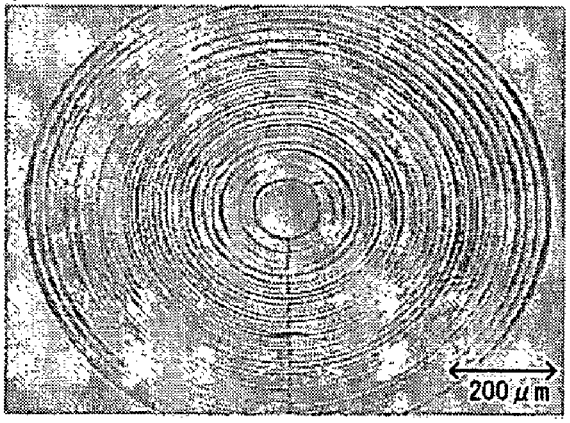
FIG. 9 is optical microscopic images of front and cross-sectional views of the binary lens relating to Comparison Example 2.
Figure 9:
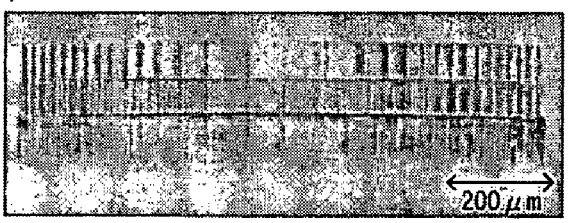

As a result, the front face of the formed binary lens presented a concentric pattern similar to that of the above Embodiment 2 as shown in the picture of FIG. 9 (*a*). The binary lens has a diameter of 1.06 mm as same as the above Embodiment 2. On the other hand, the cross-section of the binary lens presented the pattern as shown in the picture of FIG. 9 (*b*) with a processed region 260 µm thick, namely more than two times that of the above Embodiment 2. In this case, since the thickness of the processed region of the binary lens increased, the focal point of the binary lens is located at 17.9 mm. The spot diameter at the focal point was 19 µm at this time. By the way, the processing time of the binary lens in this embodiment was about 6 hours and 30 minutes.

What is claimed is:

1. A refractive index controlled diffractive optical element having two-dimensional refractive index distribution to be written on a transparent material, wherein a first refractive index region with a refractive index $n_1$ and width $d_1$ is formed in said transparent material, and ith refractive index region with a refractive index $n_i$ where $n_i \neq n_{i-1}$ and a width $d_i$ is formed adjacent to the (i−1)th refractive index region on the opposite side of (i−2)th refractive index region across the (i−1)th refractive index region in the case of i is larger than 2, and on the arbitrary side of (i−1)th refractive index region in the case of i is equal to 2, where i is an integer within a range of $2 \leq i \leq x$, and where x is an integer not less than 3 and x is the maximum number of the refractive index region.

2. A refractive index controlled diffractive optical element according to claim 1, wherein a first through xth refractive index regions are formed inside a transparent material.

3. A refractive index controlled diffractive optical element according to claim 2, wherein said transparent material is silica glass or a single crystal sapphire.

4. A refractive index controlled diffractive optical element according to claim 3, wherein a first refractive index region is located adjacent to the xth region and opposite to the (x−1)th region and the first through xth refractive index regions incrementally increase or decrease in refractive index by a constant value in a range from $n_1$ to $n_x$.

5. A refractive index controlled diffractive optical element used as a grating according to claim 4, wherein the first through xth refractive index regions are formed in parallel with each other and widths $d_1$ through $d_x$ of said first through xth refractive index regions have a same value.

6. A refractive index controlled diffractive optical element according to claim 4 that is used as a binary lens, wherein said two-dimensional refractive index distribution has a repetitive pattern that the first through xth refractive index regions are concentrically arranged in increasing or decreasing order of refractive index, jth ($1 \leq j \leq x$) refractive index region is circularly formed at a center of said concentric circles, (1) in the case of $1 \leq i \leq x-1$, the (i+1)th refractive index region is formed adjacent to an outer periphery of the ith refractive index region in a ring shape, (2) in the case of i=x, the first refractive index region is formed adjacent to an outer periphery of the ith refractive index region in a ring shape, and widths $d_1$ to $d_x$ of said first through xth refractive index regions are differences of radii between inner and outer peripheries of said circles.

7. A refractive index controlled diffractive optical element according to claim 6, wherein radius r representing a radius of an inner periphery of mth ring and a radius of an outer periphery of the (m−1)th ring starting from a center of a concentric circle is expressed as $$r = \sqrt{\frac{2fm\lambda}{L} - \left(\frac{m\lambda}{L}\right)^2},$$

where f is a focal length of a lens and λ is a wavelength of light to be diffracted, and L is a level number of a diffractive optical element.

8. A refractive index controlled diffractive optical element according to claim 2, wherein a first refractive index region is located adjacent to the xth region and opposite to the (x−1)th region and the first through xth refractive index regions incrementally increase or decrease in refractive index by a constant value in a range from $n_1$ to $n_x$.

9. A refractive index controlled diffractive optical element used as a grating according to claim 8, wherein the first through xth refractive index regions are formed in parallel with each other and widths $d_1$ through $d_x$ of said first through xth refractive index regions have a same value.

10. A refractive index controlled diffractive optical element according to claim 8 that is used as a binary lens, wherein said two-dimensional refractive index distribution has a repetitive pattern that the first through xth refractive index regions are concentrically arranged in increasing or decreasing order of refractive index, jth ($1 \leq j \leq x$) refractive index region is circularly formed at a center of said concentric circles, (1) in the case of $1 \leq i \leq x-1$, the (i+1)th refractive index region is formed adjacent to an outer periphery of the ith refractive index region in a ring shape, (2) in the case of i=x, the first refractive index region is formed adjacent to an outer periphery of the ith refractive index region in a ring shape, and widths $d_1$ to $d_x$ of said first through xth refractive index regions are differences of radii between inner and outer peripheries of said circles.

11. A refractive index controlled diffractive optical element according to claim 10, wherein radius r representing a radius of an inner periphery of mth ring and a radius of an outer periphery of the (m−1)th ring starting from a center of a concentric circle is expressed as $$r = \sqrt{\frac{2fm\lambda}{L} - \left(\frac{m\lambda}{L}\right)^2},$$

where f is a focal length of a lens and λ is a wavelength of light to be diffracted, and L is a level number of a diffractive optical element.

12. A refractive index controlled diffractive optical element according to claim 1, wherein said transparent material is silica glass or a single crystal sapphire.

13. A refractive index controlled diffractive optical element according to claim 12, wherein a first refractive index region is located adjacent to the xth region and opposite to the (x−1)th region and the first through xth refractive index regions incrementally increase or decrease in refractive index by a constant value in a range from $n_1$ to $n_x$.

14. A refractive index controlled diffractive optical element used as a grating according to claim 13, wherein the first through xth refractive index regions are formed in parallel with each other and widths $d_1$ through $d_x$ of said first through xth refractive index regions have a same value.

15. A refractive index controlled diffractive optical element according to claim 13 that is used as a binary lens, wherein said two-dimensional refractive index distribution has a repetitive pattern that the first through xth refractive index regions are concentrically arranged in increasing or decreasing order of refractive index, jth ($1 \leq j \leq x$) refractive index region is circularly formed at a center of said concentric circles, (1) in the case of $1 \leq i \leq x-1$, the (i+1)th refractive index region is formed adjacent to an outer periphery of the ith refractive index region in a ring shape, (2) in the case of i=x, the first refractive index region is formed adjacent to an outer periphery of the ith refractive index region in a ring shape, and widths $d_1$ to $d_x$ of said first through xth refractive index regions are differences of radii between inner and outer peripheries of said circles.

16. A refractive index controlled diffractive optical element according to claim 15, wherein radius r representing a radius of an inner periphery of mth ring and a radius of an outer periphery of the (m−1)th ring starting from a center of a concentric circle is expressed as $$r = \sqrt{\frac{2fm\lambda}{L} - \left(\frac{m\lambda}{L}\right)^2},$$

where f is a focal length of a lens and $\lambda$ is a wavelength of light to be diffracted, and L is a level number of a diffractive optical element.

* * * * *

UNITED STATES PATENT AND TRADEMARK OFFICE
CERTIFICATE OF CORRECTION

PATENT NO. : 7,672,050 B2  Page 1 of 1
APPLICATION NO. : 11/486113
DATED : March 2, 2010
INVENTOR(S) : Daisuke Shibata et al.

It is certified that error appears in the above-identified patent and that said Letters Patent is hereby corrected as shown below:

Title Page item (73), should read:
Assignee: NAMIKI SEIMITSU HOUSEKI KABUSHIKI KAISHA (nJP)

Signed and Sealed this

Third Day of August, 2010

David J. Kappos
*Director of the United States Patent and Trademark Office*